United States Patent
Nedelec et al.

[11] 3,714,203
[45] Jan. 30, 1973

[54] 1-OXA-A-NOR STEROIDS
[75] Inventors: Lucien Nedelec, Clich-sous-Bois; Vesperto Torelli, Maisons-Alfort, both of France
[73] Assignee: Roussel Uclaf, Paris, France
[22] Filed: July 7, 1969
[21] Appl. No.: 839,659

[30]  Foreign Application Priority Data

July 9, 1968  France...............................68158476

[52] U.S. Cl. ......260/343.3, 260/295.5 P, 260/347.5, 260/348 C, 260/590, 424/266, 424/279
[51] Int. Cl. ..............................................C07d 5/10
[58] Field of Search....................................260/343.3

[56]  References Cited
UNITED STATES PATENTS
3,483,223  12/1969  Levine et al........................260/343.3

*Primary Examiner*—Alex Mazel
*Assistant Examiner*—Anne Marie T. Tighe
*Attorney*—Hammond & Littell

[57]  ABSTRACT 1-oxa-A-Nor steroids of the formula

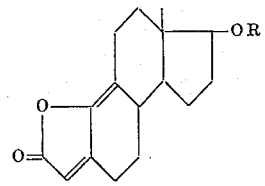

wherein R is selected from the group consisting of hydrogen, acyl of an organic carboxylic acid of one to 18 carbon atoms and alkyl of one to five carbon atoms which may be further substituted with an aryl, alkoxy and alkylthio which have anti-androgenic activity and their preparation and use.

5 Claims, No Drawings

1-OXA-A-NOR STEROIDS

STATE OF THE ART

There are known 2-oxa-$\Delta^{4,9}$-diene steroids such as 2-oxa-17β-acetoxy-$\Delta^{4,9}$-estradiene-3-one which possesses anabolic and androgenic activity. In contrast thereto, the 1-oxa-A-nor-$\Delta^{3(5),9}$-diene steroids of the present invention possess an important anti-androgenic activity.

OBJECTS OF THE INVENTION

It is an object of the invention to provide 1-oxa-A-nor-$\Delta^{3(5),9}$-estradienes of Formula I.

It is a further object of the invention to provide a process and novel intermediates for the steroids of Formula I.

It is an additional object of the invention to provide anti-androgenic compositions.

It is another object of the invention to provide a method of inducing anti-androgenic activity in warm-blooded animals.

These and other objects and advantages of the invention will become obvious from the following detailed description.

THE INVENTION

The 1-osa-A-nor-$\Delta^{3(5),9}$-estradiene-2-ones of the invention have the formula

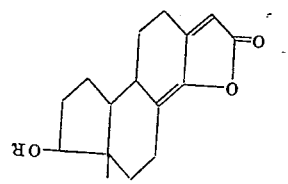

wherein R is selected from the group consisting of hydrogen, acyl of an organic carboxylic acid of one to 18 carbon atoms, and alkyl of one to five carbon atoms which may be further substituted with aryl, alkoxy and alkylthio which have antiandrogenic activity and their preparation and use.

Examples of suitable organic acids of one to 18 carbon atoms may be derived from an aliphatic, aromatic, cycloaliphatic or heterocyclic carboxylic acid. Examples of suitable acids are alkanoic acids, such as formic acid, acetic acid, propionic acid, butyric acid, isobutyric acid, valeric acid, isovaleric acid, trimethyl acetic acid, caproic acid, β-trimethyl propionic acid, heptanoic acid, caprylic acid, pelarginic acid, capric acid, undecylic acid, lauric acid, myristic acid, palmitic acid and stearic acid; alkenoic acids, such as undecylenic acid and oleic acid; cycloalkyl carboxylic acids, such as cyclopentyl carboxylic acid, cyclopropyl carboxylic acid, cyclobutyl carboxylic acid and cyclohexyl carboxylic acid; cycloalkyl alkanoic acids, such as cyclopentyl acetic acid, cyclohexyl acetic acid, cyclopentyl propionic acid and cyclohexyl propionic acid; arylalkanoic acids, such as phenyl acetic acid and phenyl propionic acid; aryl carboxylic acids, such as benzoic acid and 2,4-dinitrobenzoic acid; phenoxy alkanoic acids, such as phenoxy acetic acid, p-chlorphenoxy acetic acid, 2,4-dichlorophenoxy acetic acid, 4-ter-butylphenoxy acetic acid, 3-phenoxy propionic acid and 4-phenoxy butyric acid; heterocyclic carboxylic acids, such as furane-2-carboxylic acid, 5-terbutylfurane-2-carboxylic acid, 5-bromo-furane-2-carboxylic acid and nicotinic acids; β-ketoalkanoic acids, such as acetylacetic acid, propionylacetic acid and butyryl- acetic acid; amino acids, such as diethylaminoacetic acid and aspartic acid.

As noted above, the compounds of formula I have an important anti-androgenic activity and 1-oxa-17β-OR-A-nor-$\Delta^{3(5),9}$-estradiene-2-ones of Formula I have an important anti-androgenic activity without any perceptible androgenic activity.

The process of the invention for the preparation of compounds of Formula I comprises reacting des A-$\Delta^9$-estrene-17β-ol-5-one of the formula

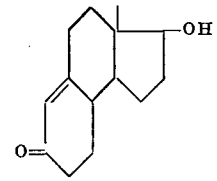

with an epoxidation agent to form 9β,10β-epoxy-desA-estrane-17β-ol-5-one of the formula

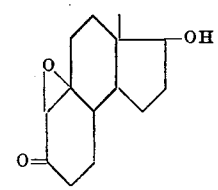

reacting the latter with an acylating derivative of an organic carboxylic acid to form the corresponding 9β,10β-epoxy-17β-OR₁-desA-estrane-5-one of the formula

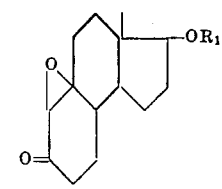

wherein R₁ is acyl of an organic carboxylic acid of one to 18 carbon atoms, reacting the latter with a lower alkyl haloacetate in the presence of zinc to form the corresponding 5-alkoxycarbonylmethyl-9β,10β-epoxy-17β-OR₁-desA-estrane-5-ol of the formula

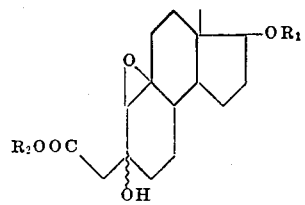

wherein R₂ is lower alkyl, subjecting the latter to the action of hydrogen halide to form the corresponding 1-oxa-9α-halo-17β-OR₁-A-nor-estrane-5ξ-ol-2-one of the formula

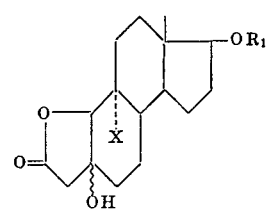

wherein X is chlorine or bromine, reacting the latter with an organic sulfonyl chloride to form the corresponding compound of the formula

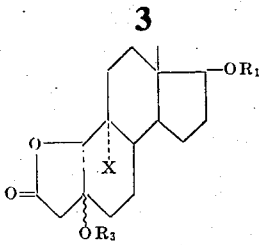

VII wherein R₃ is methane sulfonyl or p-toluene sulfonyl and reacting the latter with an organic tertiary base to form the corresponding 1-oxa-A-nor-$\Delta^{3(5),9}$-estradiene-2-one of Formula I wherein R is acyl of an organic carboxylic acid of one to 18 carbon atoms. The said compound can be subjected to the action of a saponification agent or an acid hydrolysis agent to form 1-oxa-A-nor-$\Delta^{3(5),9}$-estradiene-17Δ-ol-2-one which can be reacted with an etherification agent or an esterification agent.

In a preferred mode of the process of the invention, the epoxidation is effected with hydrogen peroxide in an alkali metal alcoholate medium. The lower alkyl haloacetate is preferably methyl or ethyl bromoacetate, methyl or ethyl chloroacetate or methyl or ethyl iodoacetate. The organic tertiary base is preferably collidine, dimethylaniline or diethylaniline. A suitable saponification agent is a mineral base such as sodium bicarbonate in an alcoholic media and the acid hydrolysis agent may be a mineral acid such as hydrochloric acid in an alcoholic medium or a sulfonic acid such as p-toluene sulfonic acid in an alcoholic medium.

The antiandrogenic compositions of the invention without any noticeable androgenic activity are comprised of an effective amount of at least one compound of formula I and a major amount of a pharmaceutical carrier. The compositions may be in the form of injectable solutions or suspensions in ampoules or multiple dose flacons or in the form of tablets, coated tablets, sublingual tablets, capsules, suppositories, pomades, creams or lotions prepared in known ways. The compositions are useful for the treatment of prostate adenome, hyperandrogenia, acne and hirsutism.

The method of the invention of inducing antiandrogenic activity in warm-blooded animals comprises administering to warm-blooded animals a safe and effective amount of at least one compound of Formula I. The compounds may be administered orally, perlingually, transcutaneously, rectally or topically. The usual useful daily dose is 0,8 to 9 mg/Kg depending upon the method of administration.

In the following example there are described several preferred embodiments to illustrate the invention. However, it should be understood that the invention is not intended to be limited to the specific embodiments.

EXAMPLE

Preparation of 1-oxa-17β-acetoxy-A-nor-$\Delta^{3(5),9}$-estradiene-2-one

STEP A: 9β,10β-epoxy-desA-estrane-17β-ol-5-one 26.4 cc of 30 percent hydrogen peroxide and 8.8 cc of 5N sodium hydroxide were added to a solution of 22 gm of desA-$\Delta^9$-estraene-17β-ol-5-one (obtained by process of U.S. Pat. No. 3,150,152) in 110 cc of methanol and the temperature was maintained at 20°C. After three hours of contact, the reaction mixture was diluted with water and then was extracted with methylene chloride. The organic phase was washed with water, dried and the solvent was distilled off to obtain 18 gm (76 percent yield) of 9β,10β-epoxy-des A-estrane-17β-ol-5-one which was used as is for the next step.

STEP B: 9β,10β-epoxy-17β-acetoxy-des A-estrane-5-one

The 18 gm of 9β,10β-epoxy-des A-estrane-17β-ol-5-one obtained in Step A in a mixture of 40 cc of acetic acid anhydride and 60 cc of pyridine were heated at 50°C for 1 hour and after cooling to room temperature, the excess acetic acid anhydride was hydrolyzed. The reaction mixture was diluted with water and vacuum filtered to obtain 18.3 gm (86 percent yield) of raw 9β,10β-epoxy-17β-acetoxy-des A-estrane-5-one. The raw product was recrystallized from a mixture of ethanol-water (3:1) to obtain 16 gm of pure product having a melting point of 135°C and a specific rotation $[\alpha]_D^{20} = -88.5° \pm 1.5$ (C = 1.2 percent in chloroform).

The product occurred in the form of colorless needles soluble in chloroform and acetone, slightly soluble in alcohol and insoluble in water.

Analysis: $C_{16}H_{22}O_4$; molecular weight = 278.35
Calculated: % C 69.04 % H 7.97
Found: % C 68.5–68.3 % H 7.8–7.8

I. R. Spectrum (chloroform)

Absence of —OH and presence of acetate at 1,735 cm⁻¹.

STEP C: 1-oxa-9α-chloro-17β-acetoxy-A-nor-estrane-5ξ-ol-2-one

Fifteen gm of 9β,10β-epoxy-17β-acetoxy-des A-estrane-5-one were dissolved in 150 cc of tetrahydrofuran and 220 cc of a solution of an organozinc of ethyl bromoacetate in methylal titrating 0.75 mol per liter was added to the solution with stirring. After 45 minutes of contact, the reaction mixture was diluted with water, made acidic with 2N hydrochloric acid and was extracted with ether. The ether was distilled from the organic phase to obtain 21 gm of raw product which was dissolved in 100 cc of acetone. Forty cc of 6N hydrochloric acid was added to the acetone solution which was then stirred for 1½ hours at room temperature. About 40 cc of acetone were then distilled off and the mixture was diluted with water and ice-cooled for 10 minutes. The mixture was vacuum filtered and the crystals were washed with water and dried to obtain 10.16 gm (53 percent yield) of 1-oxa-9α-chloro-17β-acetoxy-A-nor-estrane-5ξ-ol-2-one. The product was purified by recrystallization from a mixture of methanol-methylene chloride (10:1) to obtain a product having a melting point of 240°C and a specific rotation $[\alpha]_D^{20} = -65.5°$ (C = 0.6 percent in chloroform).

The product occurred in the form of colorless needles which were soluble in chloroform and acetone, slightly soluble in alcohol and insoluble in water.

Analysis: $C_{18}H_{25}O_5Cl$: molecular weight = 356.86
Calculated: % C 60.58 % H 7.06 % Cl 9.94
Found: % C 60.9 % H 6.8 % Cl 9.6

I. R. Spectrum (chloroform):
  Presence of —OH at 3,560 cm⁻¹
  Presence of γ-lactone at 1,793 cm⁻¹
  Presence of acetate at 1,725 cm⁻¹

STEP D: 1-oxa-5ξ-methylsulfonyloxy-9α-chloro-17β-acetoxy-A-nor-estrane-2-one 1.28 gm of 1-oxa-9α-chloro-17β-acetoxy-A-nor-estrane-5ξ-ol-2-one were dissolved in 13 cc of pyridine and after cooling the solution with an ice bath, 1.3 cc of methane sulfonyl chloride was added thereto with stirring and the mixture was left standing at 0°C overnight.

The mixture was added to ice containing 15 cc of hydrochloric acid and the mixture was extracted with methylene chloride. The methylene chloride phases were washed with water, dried and concentrated to dryness to obtain 1.8 gm of raw product. The product was purified by passage through a silica gel column with elution with chloroform containing 2 percent acetone to obtain 0.9 gm (42 percent yield) of 1-oxa-5ξ-methylsulfonyloxy-9α-chloro-17β-acetoxy-A-nor-estrane-2-one which after recrystallization from methanol had a melting point of 218°C and a specific rotation $[\alpha]_D^{20} = -61° \pm 1.5°$ (C = 1 percent in chloroform). The product occurred as colorless crystals soluble in chloroform and insoluble in water.
Analysis: $C_{19}H_{27}O_7ClS$; molecular weight = 434.94
Calculated % C 52.47 % H 6.26 % S 7.37 % Cl 8.15
Found: % C 52.6 % H 6.2 % S 7.6 % Cl 8.3
I. R. Spectrum (chloroform)
Absence of —OH
Prescence of γ-lactone at 1,797 cm$^{-1}$
Presence of acetate at 1,725 cm$^{-1}$ STEP E: 1-oxa-17β-acetoxy-A-nor-Δ$^{3(5),9}$-estradiene-2-one 0.25 gm of 1-oxa-5ξ-methylsulfonyloxy-9α-chloro-17β-acetoxy-A-nor-estrane-2-one in 4 cc of γ-collidine were heated at reflux for 30 minutes and then were cooled. The mixture was poured over ice and was acidified with hydrochloric acid. After vacuum filtering, the crystals were washed with water and dried to obtain 0.17 gm of 1acetoxy-A-nor-Δ17β-acetocy-A-nor-Δ$^{3(5),9}$-estradiene-2-one having a melting point of 146°C.

EXAMPLE II

One gm of 1-oxa-9α-chloro-17β-acetoxy-A-nor-estrane-5ξ-ol-2-one was dissolved in 10 cc of pyridine and after the addition of 2 cc of methane sulfonyl chloride, the mixture was allowed to stand at room temperature for 64 hours. The reaction mixture was poured over ice, was made acidic by the addition of hydrochloric acid and was extracted with methylene chloride. The organic phase was washed with water, dried over sodium sulfate, treated with carbon black and concentrated to dryness to obtain 845 mg of raw product. The said product was purified by recrystallization from hot and cold methanol to obtain 725 mg of 1-oxa-17Δ-acetoxy-A-nor-Δ$^{3(5),9}$-estradiene-2-one having a melting point of 140°C and then 155°C.

For analysis, 2.56 gm of the said compound was chromatographed over silica gel with elution with a mixture of benzene-ethyl acetate (7:3) and recrystallization from hot and cold methanol to obtain 2.23 gm of 1-oxa-17β-acetoxy-A-nor-Δ$^{3(5),9}$-estradiene-2-one melting at 142°C and then 157°C and having a specific rotation $[\alpha]_D^{20} = + 74 \pm 2.5°$ (C = 0.6 percent in chloroform).

The product occurred in the form of colorless prisms soluble in chloroform and acetone, slightly soluble in alcohol and insoluble in water.
Analysis: $C_{18}H_{22}O_4$; molecular weight = 302.37
Calculated: % C 71.50 % H 7.33
Found: % C 71.7 % H 7.3
I. R. Spectrum (chloroform):
Absence of —OH
Carbonyl absorption at 1,766 cm$^{-1}$, 1,746 cm$^{-1}$ and 1,727 cm$^{-1}$ Presence of C = C at 1,670 cm$^{-1}$, 1,655 cm$^{-1}$, 1,637 cm$^{-1}$ and 1,608 cm$^{-1}$.
U.V. Spectrum (ethanol)

Inflexion towards 235 mμ $E_{1cm}^{1\%} = 102$

Max. at 287 mμ $E_{1cm}^{1\%} = 737$ $\epsilon = 22,300$

As far as is known, none of the products prepared in Examples I and II are described in the literature.

PHARMACOLOGICAL STUDY

Exogenic Antiandrogenic Activity

The exogenic antiandrogenic activity was determined in comparison with testosterone propionate in castrated male rats using the method of Lerner described in Dorfman's Method in Hormones Research, Vol. II, p. 320. Four-week old male rats were castrated and the treatment was started the day after castration and lasted 7 days. On the 8th day, the animals were sacrificed and the following organs were separated: prostate, levator ani and seminal vesicles. 1-oxa-17β-acetoxy-A-nor-Δ$^{3(5),9}$-estradiene-2-one in solution in olive oil containing 5 percent benzyl alcohol was administered subcutaneously daily at a dose of 1 mg and 5 mg per rat per day. Testosterone propionate was administered subcutaneously daily at a dose of 50γ per rat per day. There was a control group of rats which received the solvent only; a group of rats receiving subcutaneously 50γ of testosterone propionate; two groups of rats which received subcutaneously 1 mg or 5 mg respectively of the product of the invention; and two groups of rats which received subcutaneously 50γ of testosterone propionate and 1 mg or 5 mg respectively of the product of the invention. The results are shown in Table I.

TABLE I

| Treatment | Daily Doses | Fresh Levator ani mg | Seminal Vesicles in mg | Prostate in mg |
|---|---|---|---|---|
| Control | 0 | 20.8 | 8.7 | 18.5 |
| Testosterone propionate | 50γ | 34.2 | 67.5 | 111.1 |
| 1-oxa-17β-acetoxy-A-nor-Δ3(5),9-estradiene-2-one | 1 mg | 24.0 | 10.8 | 18.9 |
| 1-oxa-17β-acetoxy A-nor Δ3(5),9-estradiene-2-one + testosterone propionate | 1 mg + 50 γ | 35.4 | 39.0 (−42%) | 72.0 (−35%) |
| Control | 0 | 16.2 | 5.1 | 6.0 |
| testosterone propionate | 50 γ | 31.3 | 66.7 | 91.2 |
| 1-oxa-17β-acetoxy-A-nor-Δ3(5),9-estradiene-2-one | 5 mg | 24.0 | 9.4 | 9.3 |
| 1-oxa-17β-acetoxy-A-nor-Δ3(5),9-estradiene-2-one + testosterone propionate | 5 mg + 50 γ | 27.7 | 29.3 (−56%) | 50.7 (−45%) |

The results of Table I show that 1-oxa-17β-acetoxy-A-nor-Δ$^{3(5),9}$-estradiene-2-one exercises a clear antiandrogenic activity at a dose of 1 mg vis-a-vis with 50γ of testosterone propionate and when administered alone does not manifest any androgenic activity.

Various modifications of the compositions and method of the invention may be made without departing from the spirit or scope thereof.

We claim:

1. A 1-oxa-A-nor-$\Delta^{3,(5),9}$-estradiene of the formula

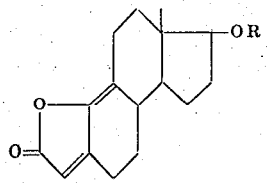

wherein R is selected from the group consisting of hydrogen, acyl of an alkanoic acid of one to 18 carbon atoms and alkyl of one to five carbon atoms.

2. A compound of claim 1 wherein R is acetyl.

3. 1-oxa-9α-chloro-17β-acetoxy-A-nor-estrane-5ξ-ol-2-one.

4. 1oxa-5ξ-methylsulfonyloxy-9α-chloro-17β-acetoxy-A-nor-estrane-2-one.

5. A process for the preparation of a compound of claim 1 in which R is an acyl of an alkanoic acid of one to 18 carbon atoms which comprises reacting des A-$\Delta^9$-estrene-17β-ol-5-one of the formula

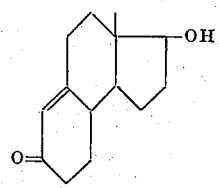

with an epoxidation agent to form 9β,10β-epoxy-des A-estrane-17β-ol-5-one of the formula

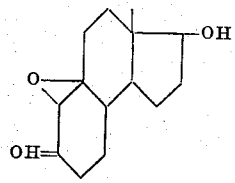

reacting the latter with an organic hydrocarbon carboxylic acid anhydride to form the corresponding 9β,10β-epoxy-17β-$OR_1$-des A-estrane-5-one of the formula

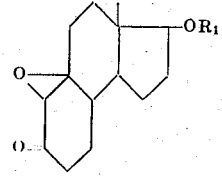

wherein $R_1$ is acyl of an organic carboxylic acid of one to 18 carbon atoms, reacting the latter with a lower alkyl haloacetate in the presence of zinc to form the corresponding 5-alkoxycarbonylmethyl-9β,10β-epoxy-17β-$OR_1$-desA-estrane-5-ol of the formula

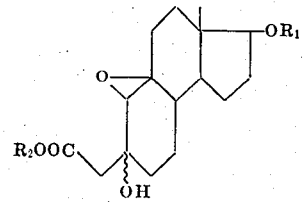

wherein $R_2$ is lower alkyl, subjecting the latter to the action of hydrogen halide to form the corresponding 1-oxa-9α-halo-17β-$OR_1$-A-nor-estrane-5ξ-ol-2-one of the formula

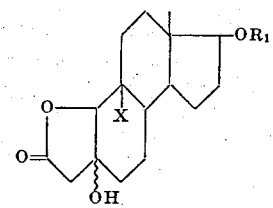

wherein X is chlorine or bromine, reacting the latter with an organic sulfonyl chloride to form the corresponding compound of the formula

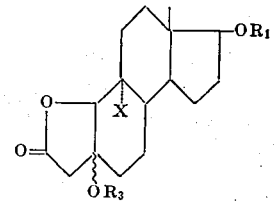

wherein $R_3$ is methane sulfonyl or p-toluene sulfonyl and reacting the latter with an organic tertiary base to form the corresponding 1-oxa-A-nor-$\Delta^{3(5),9}$-estradiene-2-one of claim I wherein R is acyl of an alkanoic acid of one to 18 carbon atoms.

* * * * *